(12) United States Patent
Araki et al.

(10) Patent No.: US 6,278,674 B1
(45) Date of Patent: Aug. 21, 2001

(54) PHASE CHANGE OPTICAL DISK INITIALIZING APPARATUS

(75) Inventors: Shigeru Araki; Tsutomu Matsui; Yuki Fujimura, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/988,271

(22) Filed: Dec. 10, 1997

(30) Foreign Application Priority Data

Dec. 13, 1996 (JP) .................................................. 8-333401

(51) Int. Cl.[7] ......................................................... G11B 3/90
(52) U.S. Cl. ................................. 369/54; 369/47; 369/116
(58) Field of Search ................................ 369/32, 47, 48, 369/54, 58, 59, 100, 113, 116, 275.2, 275.1, 288

(56) References Cited

U.S. PATENT DOCUMENTS

| | | | |
|---|---|---|---|
| 4,980,879 | * 12/1990 | Yamada et al. | 369/100 |
| 4,982,396 | * 1/1991 | Yasuoka et al. | 369/100 |
| 5,130,971 | * 7/1992 | Ohno et al. | 369/116 |
| 5,272,667 | * 12/1993 | Yamada et al. | 365/113 |
| 5,383,172 | * 1/1995 | Holtslag et al. | 369/100 |
| 5,688,574 | * 11/1997 | Tamura et al. | 369/288 X |
| 5,745,463 | * 4/1998 | Maegawa et al. | 369/59 |
| 5,761,179 | * 6/1998 | Iwasaki et al. | 369/116 |
| 5,784,355 | * 7/1998 | Abe | 369/116 |
| 5,848,043 | * 12/1998 | Takada et al. | 369/116 |

FOREIGN PATENT DOCUMENTS

| | | |
|---|---|---|
| 61-13453 | 1/1986 | (JP) . |
| 61-206938 | 9/1986 | (JP) . |
| 3-272022 | 12/1991 | (JP) . |
| 4-102227 | 4/1992 | (JP) . |
| 4-103029 | 4/1992 | (JP) . |
| 4-125829 | 4/1992 | (JP) . |
| 4-278224 | 10/1992 | (JP) . |
| 6-168446 | 6/1994 | (JP) . |
| 7-161038 | 6/1995 | (JP) . |
| 7-192266 | 7/1995 | (JP) . |

* cited by examiner

Primary Examiner—Paul W. Huber
(74) Attorney, Agent, or Firm—Young & Thompson

(57) ABSTRACT

An initializing apparatus includes a laser light source for emitting an erasing laser light for initializing an optical disk, a laser drive circuit for driving the laser light source according to an AC waveform signal, an optical system for irradiating the optical disk with the erasing laser light and track address detecting circuitry for detecting the track address. Furthermore, the laser light source, the laser drive circuit and the optical system are previously adjusted so that an amorphous portion having a size of ½ or less of a wavelength of the erasing laser light may be formed at the inside of a melting re-crystallization portion.

5 Claims, 6 Drawing Sheets

TIMING OF LASER PULSE REFLECTION

BEAM CENTER POSITION

PHASE CHANGE OPTICAL DISK INITIALIZING APPARATUS

BACKGROUND OF THE INVENTION

1. Field of the Invention

The present invention relates to an initializing apparatus for initializing a state of a recording layer of a phase change optical disk (hereinafter referred to as an "optical disk").

2. Description of the Related Art

A first prior art device will be described below with reference to FIGS. 5(a) and 5(b).

In the first prior art device, laser light L is emitted from a gain waveguide type high output semiconductor laser 50. The laser light L is focused on an optical disk D through a collimator lens 52 and an objective lens 54. In cases where the objective lens 54 has a NA (numerical aperture) of 0.5, the size of the spot $S_{10}$ on the optical disk D is 1×50 $\mu m^2$ at the half-width of the beam intensity distribution. The initialization of a recording layer of the optical disk is accomplished by crystallization of the whole region in the spot $S_{10}$ of the recording layer, irradiated by the erasing laser light from the laser 50 driven by a DC (direct current) signal (referred to as a "DC drive" below) to emit at a constant output.

A second prior art device will be described below with reference to FIGS. 6(a)–6(d).

The second prior art device is disclosed in Japanese Patent Application Laid-open No. Hei 4-278224. Unlike the first prior art device, a pulsed output of the laser light is used for initialization in this case, and a broad area is initialized with the same spot size of the laser light.

FIG. 6(a) shows a condition of the recording layer irradiated with laser light driven by a one-shot drive pulse. A melting amorphous portion $S_{11}$ is the region where the recording layer melts during the one-shot pulse laser drive and is rendered amorphous after cooling, and a melting re-crystallization ring $S_{12}$ is the region where the recording layer melts during the one-shot pulse laser drive and crystallizes after cooling.

By making the output of the laser stronger than in the case of the first prior art device, a spot periphery $S_{12}$ in a crystalline state has a large outer diameter. But the light quantity of the center portion $S_{11}$ of the spot exceeds a threshold level for forming an amorphous state and a center portion $S_{11}$ of the spot is rendered amorphous. The laser is repeatedly driven by switching by pulse signals having a low duty ratio (referred to as a "pulse drive" below) with the cycle time corresponding to the width of crystallined portions as shown in FIG. 6(c) so that a crystalline portion of the spot periphery $S_{12}$ for each pulse is linked with that produced by the next pulse as shown in FIG. 6(b). By repeating this pulse drive, the whole recording layer is crystallized as shown in FIG. 6(d)

However, the above-described prior art has the following disadvantages:

1. When an initialization is performed by driving a laser light source in a DC drive as in the first prior art device, a noise (media noise) is considerably caused due to the recording medium. Thus, a sufficient S/N ratio cannot be obtained, thereby resulting in the deterioration of a bit error rate.
2. When the initialization is performed by a pulse drive as in the second prior art device, the sizes of the melting re-crystallization ring portions vary. This also causes media noise.
3. A track address, which is partially recorded on an optical disk, is also undesirably initialized.

SUMMARY OF THE INVENTION

It is an object of the present invention to provide an optical disk initializing apparatus which can reduce the media noise in an initialization and can obtain excellent recording/reproducing characteristics without the initialization of a track address.

An initializing apparatus of the present invention comprises a laser light source for emitting an erasing laser light for initializing an optical disk, a laser drive circuit for driving the laser light source so as to vary the output of the light source according to an AC signal, and an optical system for irradiating the optical disk with the erasing laser light emitted from the laser light source.

The laser light source for initializing an optical disk is driven so as to vary the output according to an AC signal (referred to as an "AC drive" below), not by a DC drive and not by a pulse drive. Since the laser light source is driven by an AC drive, media noise is more reduced than in the prior art. This has been experimentally confirmed by the inventor.

Also in the initializing apparatus of the present invention, the laser light source, the laser drive circuit and the optical system are adjusted so that an amorphous portion having a size of ½ or less of a wavelength of the erasing laser light may be formed at the inside of a re-crystallization portion.

Thus, the media noise is more considerably reduced. This has also been experimentally confirmed by the inventor.

Further, the initializing apparatus of the present invention comprises track address detecting means for detecting a track address. The laser drive circuit drives the laser light source so as to stop the irradiation of portions where the track address is detected by the track address detecting means.

Since the irradiation of the optical disk is stopped when a track address is detected by the track address detecting means, the track address is not erased.

DETAILED DESCRIPTION OF PREFERRED EMBODIMENTS

The initializing apparatus will be described below with reference to drawings.

Figure 1:
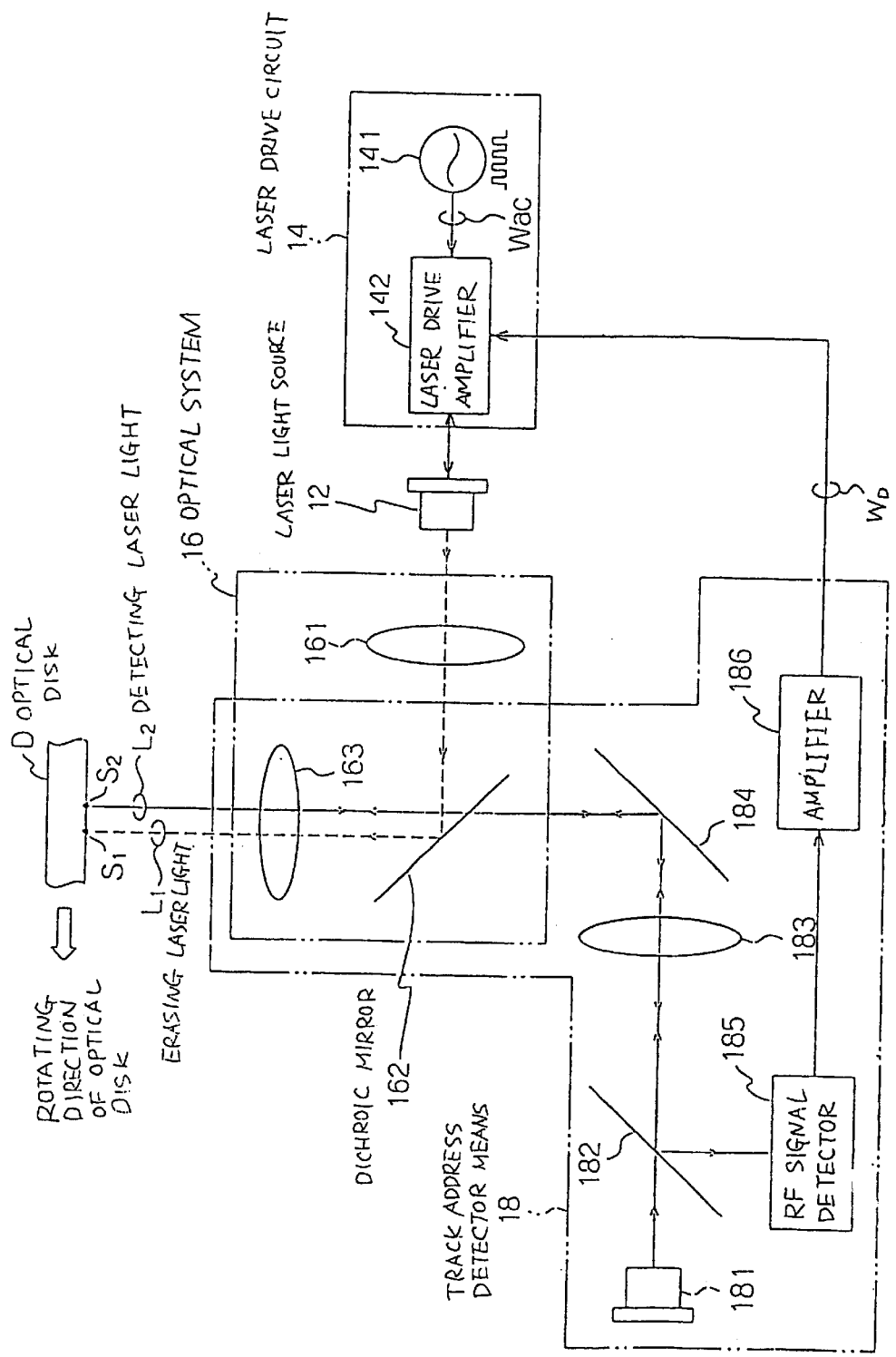
FIG. 1 is a block diagram showing an embodiment of an initializing apparatus according to the present invention.

With reference to FIG. 1, the initializing apparatus according to the present invention comprises a laser light source 12 for emitting erasing laser light $L_1$ for initializing an optical disk D, a laser drive circuit 14 for driving the laser light source 12 by an AC drive, an optical system 16 for irradiating the optical disk D with the erasing laser light $L_1$ emitted from the laser light source 12, and track address detecting means 18 for detecting a track address by a detecting laser light $L_2$. In addition, the laser light source 12, the laser drive circuit 14 and the optical system 16 are previously adjusted so that an amorphous portion having a size of ½ or less of a wavelength $\lambda_1$ of the erasing, laser light $L_1$ may be formed at the inside of a re-crystallization portion, and a melting re-crystallization portion on the periphery of the amorphous portion may be formed on the optical disk D. Furthermore, the laser drive circuit 14 drives the laser light source 12 so as to stop the irradiation of the disk at portions where a track address is detected by the track address detecting means 18, with the erasing laser light $L_1$.

The laser light source 12 has a wavelength $\lambda_1$ of 780 nm. The laser light source 12 is a gain waveguide type high output semiconductor laser. The laser drive circuit 14 comprises an AC waveform generator 141 for generating an AC waveform signal Wac and a laser drive amplifier 142 for driving the output of the laser light source 12 in accordance with the AC waveform signal Wac.

Figure 2:
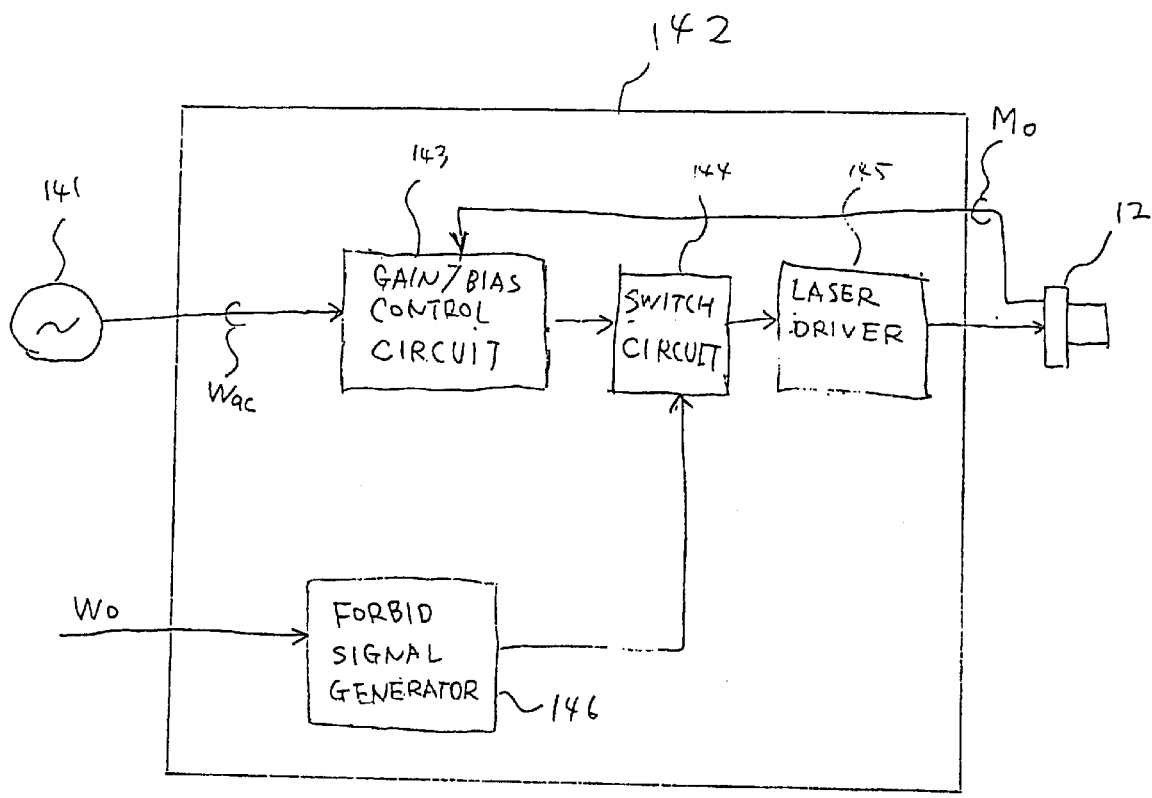
FIG. 2 is a block diagram of the laser drive amplifier in FIG. 1.

With respect to FIG. 2, the laser drive amplifier 142 comprises a gain/bias control circuit 143 for controlling the gain and bias voltage of the amplifier 142 according to a monitor signal from the laser light source, so that the output of the laser light source 12 linearly varies in accordance with the AC waveform signal Wac.

The switch circuit 144 passes through the controlled output from the gain/bias control circuit 143 or forbids the laser light source to emit according to the output signal of the laser off (forbid) signal generator 146. The laser drive amplifier 142 also comprises a laser driver 145 for feeding the current according to the signal from switch circuit 144 through the laser light source 12.

Figure 3A:
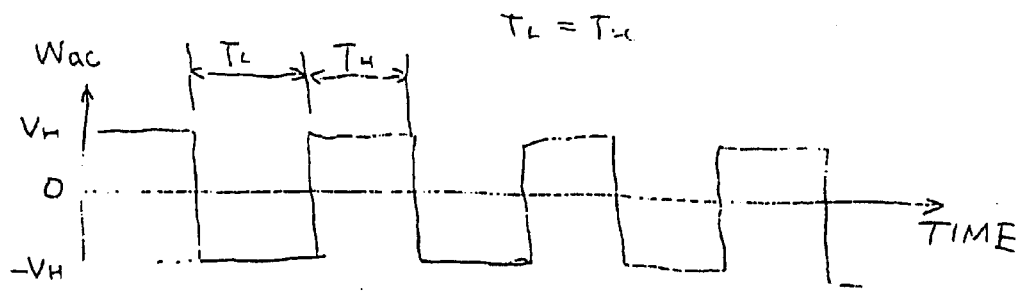
FIGS. 3(a)–3(d) are examples of an AC waveform signal Wac in FIG. 1.
Figure 3B:
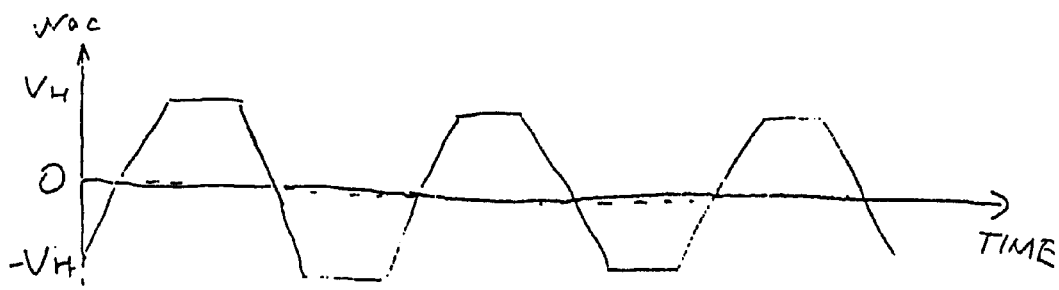
Figure 3C:
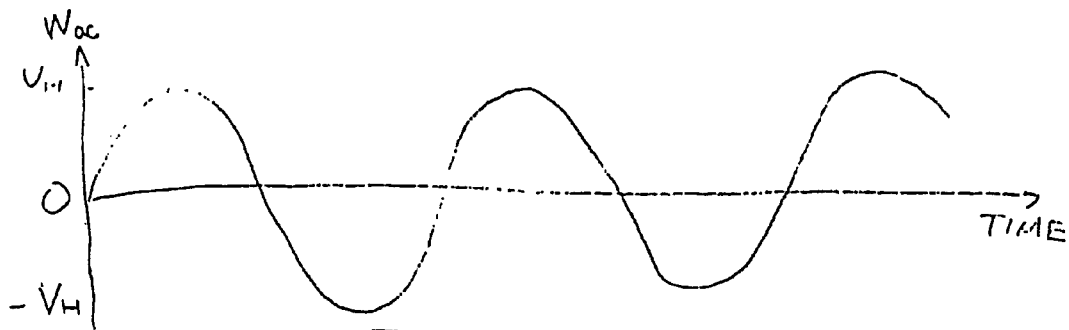
Figure 3D:
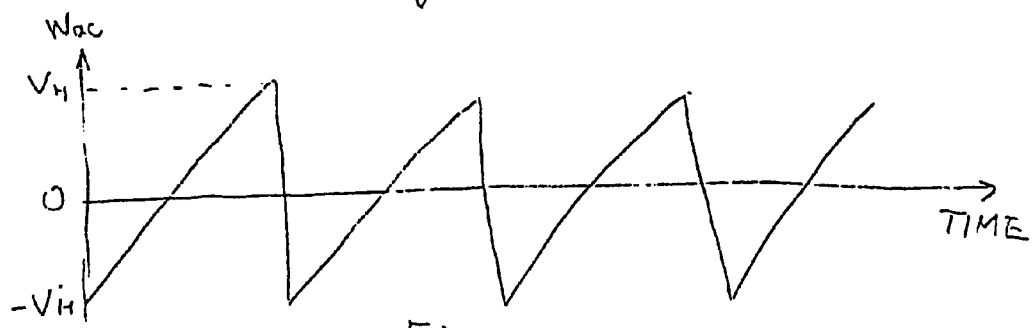

The AC waveform signal Wac may be a rectangular wave as shown in FIG. 3(a), a trapezoidal wave as shown in FIG. 3(b), a sine wave as shown in FIG. 3(c), a triangular wave as shown in FIG. 3(d) or the like. Preferably, the AC waveform signal Wac has a plus/minus-symmetrical (duty ratio ½) waveform. In this case, the laser light source emits by the duty ratio ½ and in the case of analog waves, for instance, a sine wave, the output can be varied in an analog fashion according to the waveforms.

Returning now to FIG. 1, the optical system 16 comprises a collimator lens 161, a dichroic mirror 162, an objective lens 163 or the like. The dichroic mirror 162 and the objective lens 163 are also elements of the track address detecting means 18. The dichroic mirror 162 is a low-pass type mirror which reflects the erasing laser light $L_1$ having the wavelength $\lambda_1$ of 780 nm and transmits the detecting laser light $L_2$ having a wavelength $\lambda_2$ of 680 nm.

The track address detecting means 18 comprises a laser light source 181, a beam splitter 182, a collimator lens 183, 45° mirror 184, the dichroic mirror 162, the objective lens 163, an RF signal detector 185, an amplifier 186 or the like. The laser light source 181 is a semiconductor laser having a wavelength $\lambda_2$ of 680 nm.

The operation of the initializing apparatus of the embodiment will now be described.

The laser light source 181 is used to obtain a focus error signal, a tracking error signal and an RF signal. The detecting laser light $L_2$ first passes through the beam splitter 182, and is changed to parallel light by the collimator lens 183. The detecting laser light $L_2$ is then deflected 90° by the 45° mirror 184, passes through the dichroic mirror 162, and finally reaches the objective lens 163.

The erasing laser light $L_1$ is changed to parallel light by the collimator lens 161, and is deflected by 90° by the dichroic mirror 162. The erasing laser light $L_1$ next reaches objective lens 163, and a spot $S_1$ is formed on the optical disk D by the erasing laser light $L_1$. When a light output of a beam center is defined as 100%, the size of 50% of the beam $S_1$ is 50 $\mu$m×1 $\mu$m. On the other hand, a spot $S_2$ formed by the detecting laser light $L_2$ is 0.6 $\mu$m×0.6 $\mu$m under the same conditions.

The laser off signal generator 146 in the laser drive amplifier 142 determines whether the disk portion irradiated by the detecting laser light is an address track in accordance with a track address signal which is output from the amplifier 186 and if the irradiated portion is a track address, outputs a signal to the switch circuit 144, preventing the laser light source 12 from emitting so that a track address portion is not initialized.

By the way, according to (1,7) Run Length Limited recording art, in which recording marks represent bit chains of lengths from 2T to 8T, the highest repeating frequency determined by the mark length 2T is ¾ of the frequency having the cycle time when the laser spot travels the distance of the minimum bit length equal to the laser wavelength. For example, at a linear speed of 12 m/s, if a laser wavelength is 0.68 $\mu$m, the laser light source 12 is driven at $(12 \times 10^6/0.68)(¾) = 13.2$ MHz.

Figure 4:
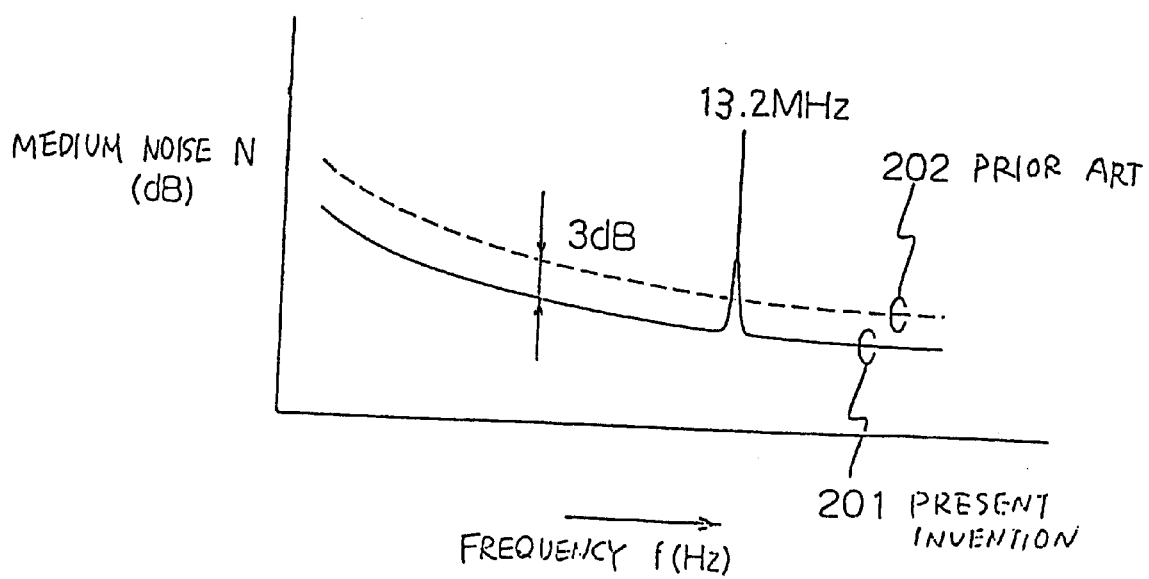
FIG. 4 is a diagram showing the frequency dependence of media noise generated by an initialization in the present invention in comparison to the prior art.
Figure 5B:
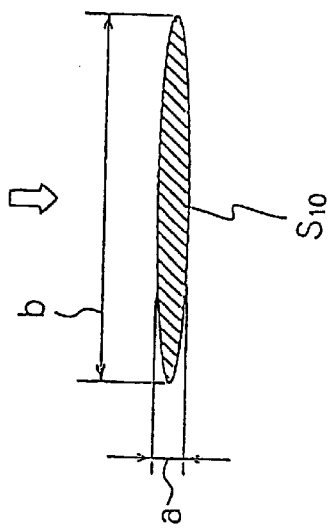
FIG. 5(b) is a schematic diagram showing a spot formed on a optical disk in the first prior art device.
Figure 5A:
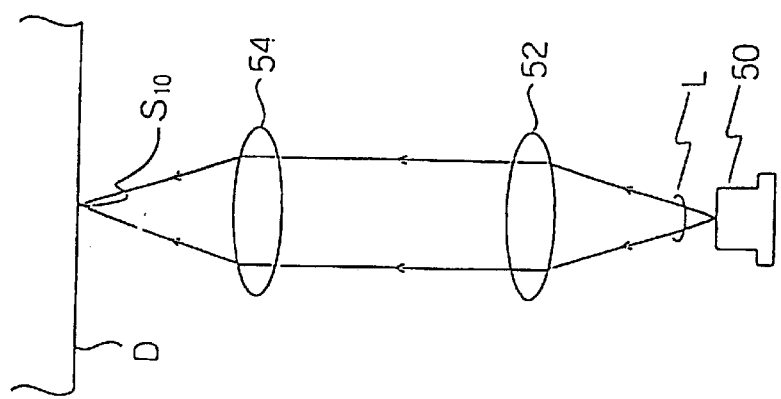
FIG. 5(a) is a schematic diagram showing construction of the first prior art device.
Figure 6A:
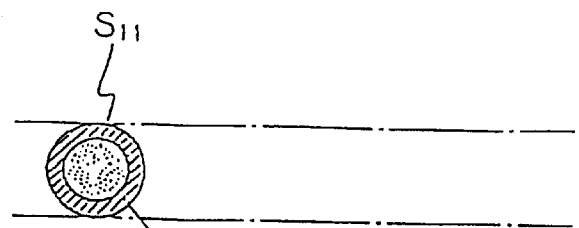
FIG. 6(a) is a schematic diagram showing the optical disk which is irradiated with laser light driven by one-shot drive pulses in the second prior art device.
Figure 6B:
FIG. 6(b) is a schematic diagram showing the optical disk after another pulse laser drive is applied in the second prior art device.
Figure 6C:
FIG. 6(c) is a schematic diagram showing a waveform to drive the laser in the second prior art device.
Figure 6D:
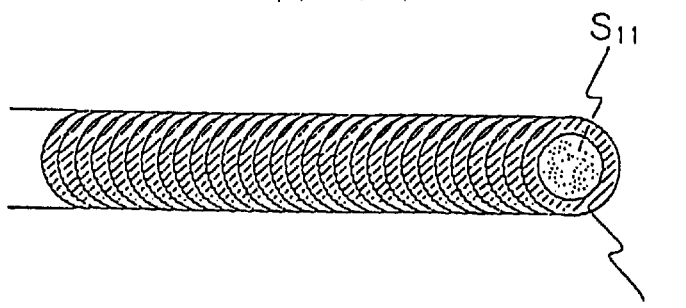
FIG. 6(d) is a schematic diagram showing the optical disk irradiated with the laser light driven by the waveform shown in FIG. 6(c).

With reference to FIG. 4, the frequency dependence is shown by a solid line 201 in the case of an AC drive of the present invention. The frequency dependence is shown by a broken line 202 in the case of a DC drive of the prior art. In the present invention, as described above, noise is caused near 13.2 MHz due to a switching drive. The media noise of the overall optical disk D is about 3 dB less than that of the prior art.

Modifications of the invention herein disclosed will occur to a person skilled in the art and all such modifications are deemed to be within the scope of this invention as defined by the appended claims.

What is claimed is:

1. A phase change optical disk initializing apparatus comprising:
    a laser light source for emitting an erasing laser light for initializing a phase change optical disk;
    a laser drive circuit for varying an output of the laser light source in accordance with an AC waveform signal;
    an optical system for irradiating said phase change optical disk with the erasing laser light emitted from said laser light source; and
    track address detecting means for detecting a track address by a detecting laser light,
    wherein said laser drive circuit drives the laser light source so as to stop the irradiation of a disk at portions where a track address is detected by said track address detecting means.

2. The phase change optical disk initializing apparatus according to claim 1, wherein said track address detecting means and said optical system include laser light irradiating means for irradiating a portion of said phase change optical disk with said detecting laser light before irradiating said portion with said erasing laser light.

3. The phase change optical disk initializing apparatus according to claim 2, wherein said laser light irradiating means comprises a dichroic mirror.

4. A phase change optical disk initializing method comprising the steps of:

generating an AC waveform signal for driving a laser light source to emit an erasing laser light for initializing a phase change optical disk;

driving the laser light source so as to vary the output of the laser light source according to the AC waveform signal;

irradiating said phase change optical disk with the erasing laser light; and detecting a track address by a detecting laser light, said driving step comprising stopping the irradiation of the portion where a track address is detected.

5. The phase change optical disk initializing method according to claim 4, wherein said track address detecting step comprises irradiating a portion of said phase change optical disk with said detecting laser light before irradiating said portion with said erasing laser light.

* * * * *